United States Patent [19]
Hattori et al.

[11] Patent Number: 4,721,369
[45] Date of Patent: Jan. 26, 1988

[54] GRADIENT INDEX SINGLE LENS

[75] Inventors: Jun Hattori; Shigeyuki Suda; Rohra Aruna, all of Atsugi, Japan

[73] Assignee: Canon Kabushiki Kaisha, Tokyo, Japan

[21] Appl. No.: 908,255

[22] Filed: Sep. 17, 1986

[30] Foreign Application Priority Data

Sep. 18, 1985 [JP] Japan ................................ 60-206052

[51] Int. Cl.⁴ ............................................. G02B 3/00
[52] U.S. Cl. ............................................... 350/413
[58] Field of Search ..................................... 350/413

[56] References Cited

U.S. PATENT DOCUMENTS

| | | | |
|---|---|---|---|
| 3,486,808 | 12/1969 | Hamblen | 350/175 |
| 3,626,194 | 12/1971 | Hirano | 250/216 |
| 4,457,590 | 7/1984 | Moore et al. | 350/413 |
| 4,647,159 | 3/1987 | Baba | 350/413 |

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

A gradient index single lens has a first surface convex toward the object side, the first surface lying on the object side when the lens is used at a reduction magnification, a second surface concave toward the image side, the second surface lying on the image side when the lens is used at a reduction magnification, and an index distribution formed in the interior of the lens, the index distribution having a sphere symmetrical distribution about a certain point on the optic axis.

4 Claims, 9 Drawing Figures

F I G. I

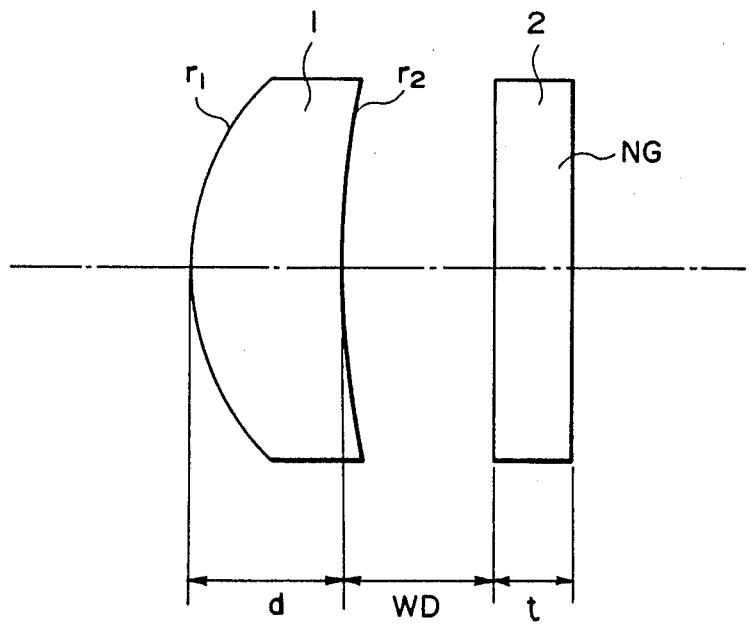
F I G. 7

GRADIENT INDEX SINGLE LENS

BACKGROUND OF THE INVENTION

1. Field of the Invention

This invention relates to an index gradient type or gradient index single lens suitable as the pick-up objective of an optical disk, a collimator lens for a semiconductor laser, or the like.

2. Related Background Art

As is well known, there are gradient index type single lenses of the types which are provided with three basic index distributions, i.e., the radial type, the axial type and the spherical type. The radial type is a type in which the index distribution exists in a radial direction perpendicular to the optic axis, the axial type is a type in which the index distribution exists in the direction of the optic axis, and in contrast, the spherical type is a type in which the index distribution is sphere-symmetrical about a point on the optic axis and the surfaces of equal refractive index are concentric spherical surfaces.

In recent years, numerous propositions have been made to use a gradient index type lens as the pick-up objective of an optical disk, but most of these propositions are concerned with the gradient index type lenses of the radial type and the axial type. On the other hand, concerning the gradient index type lens of the spherical type, for example, Japanese Laid-Open Patent Application No. 181516/1982 is proposed, but this is of a special construction in which a core having the spherical type index distribution is clad with a homogeneous medium, and cannot be said to be preferable from the viewpoint of ease of manufacture. Also, attempts to use a spherical lens having the spherical type index distribution for an optical coupler or the like have been made. However, in the pick-up objective, it is necessary to correct both spherical aberration and sine condition well, and such aberration correction has been difficult in the spherical lens as described above.

SUMMARY OF THE INVENTION

It is an object of the present invention to provide, in view of the above-noted disadvantages peculiar to the prior art, a gradient type single lens of the spherical type which corrects spherical aberration well and also satisfies sine condition.

It is a further object of the present invention to provide a gradient index type single lens suitable as the objective of an optical memory device such as an optical disk.

The index gradient type single lens according to the present invention is a single lens having a sphere-symmetrical index distribution about a certain point on the optic axis, and the surface of this single lens which is adjacent to the object side when the single lens is used at a reduction magnification is convex toward the object side and the surface of the single lens which is adjacent to the image side is concave toward the image side, thereby achieving the above objects.

By adopting such a construction, not only is there provided a single lens having a performance sufficient to be used as the pick-up lens of an optical disk or a collimator lens for a semiconductor laser, but also there is provided a gradient index type lens which suffers less from the problem in the method of manufacture. Also, to correct spherical aberration better and sufficiently satisfy sine condition, it is preferable that the following conditions be satisfied:

$$1.0 \leq f/r_1 \leq 1.8 \quad (1)$$

$$0 < f/r_2 \leq 1.9 \quad (2)$$

$$0.2 \leq d/f \leq 1.5 \quad (3)$$

where $r_1$ represents the radius of curvature of the surface of the present gradient index type single lens which is adjacent to the object side, $r_2$ represents the radius of curvature of the surface of the same single lens which is adjacent to the image side, d represents the on-axis thickness of the same single lens, and f represents the focal length of the same single lens.

In the present invention, as described above, the surface which is adjacent to the object side when the single lens is used at a reduction magnification is defined as a first surface and the surface which is adjacent to the image side is defined as a second surface and therefore, where the present gradient index type single lens is used as a pick-up objective, the surface thereof which is adjacent to the optical disk is the second surface, and where said single lens is used as a collimator lens, the surface thereof which is adjacent to the light source is the second surface.

Further features of the present invention are described in embodiments shown below.

BRIEF DESCRIPTION OF THE DRAWINGS

FIG. 7 is a cross-sectional view of the gradient index type single lens according to the present invention when used as the pick-up objective of an optical disk.

DESCRIPTION OF THE PREFERRED EMBODIMENTS

Figure 1:
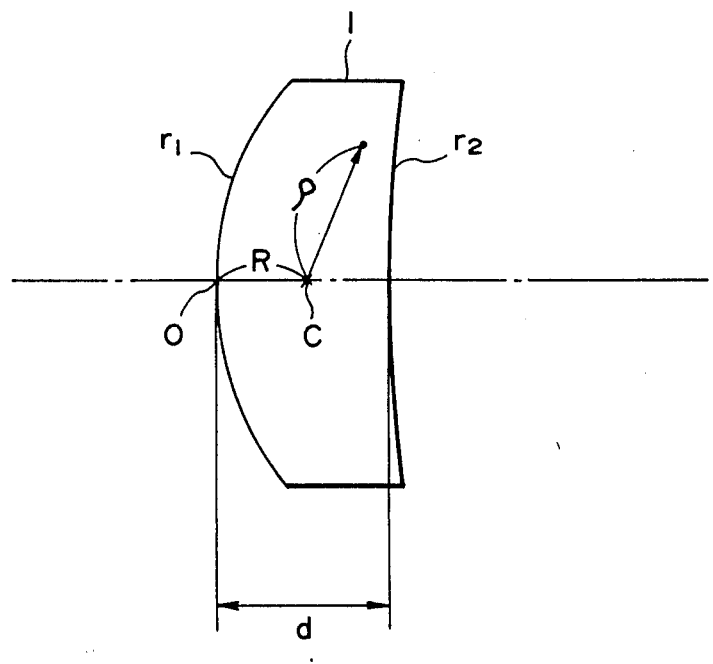
FIG. 1 shows the shape of a gradient index type single lens according to the present invention.
Figure 2:
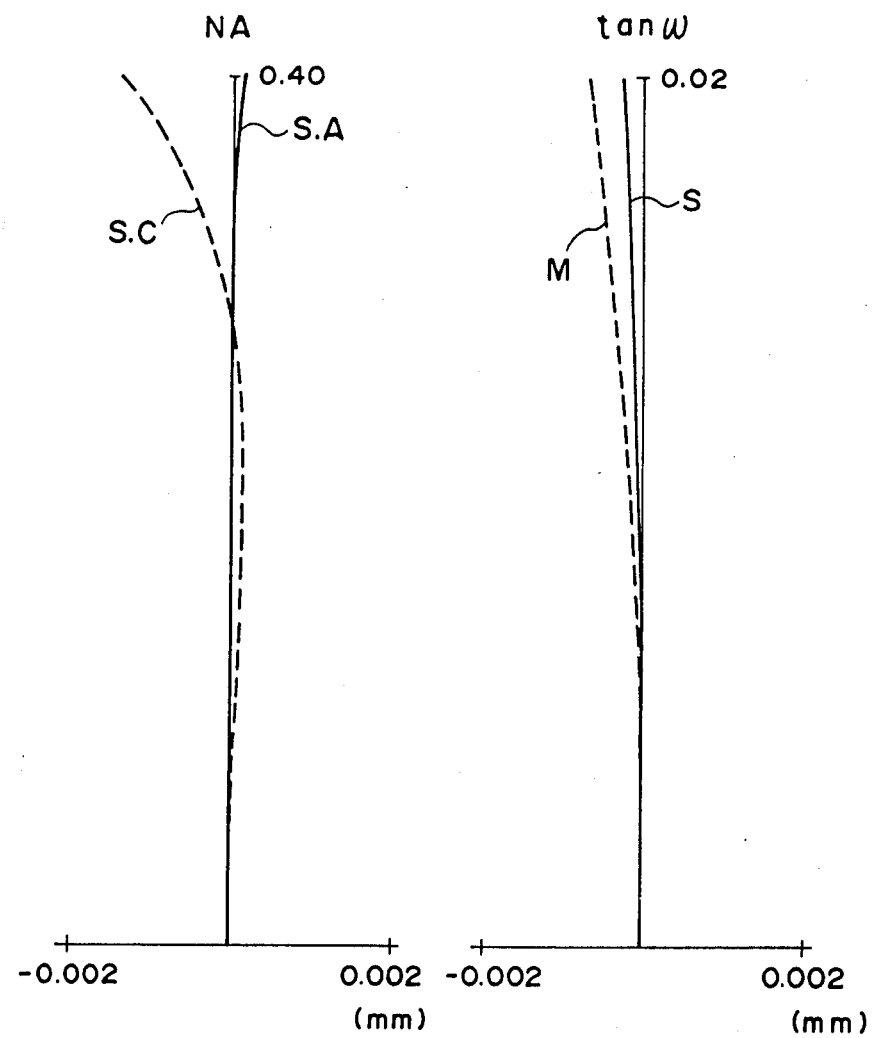
FIGS. 2 to 6 show the aberrations in gradient index type single lenses according to first to fifth embodiments of the present invention.
Figure 3:
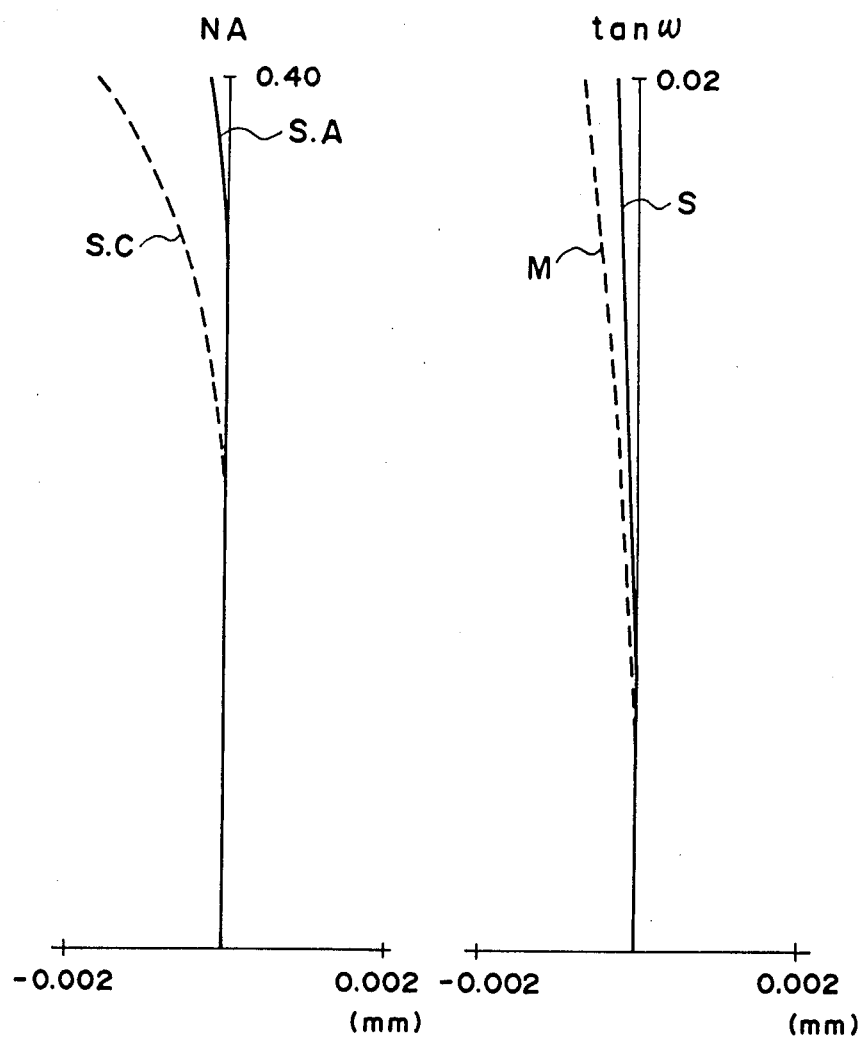
Figure 4:
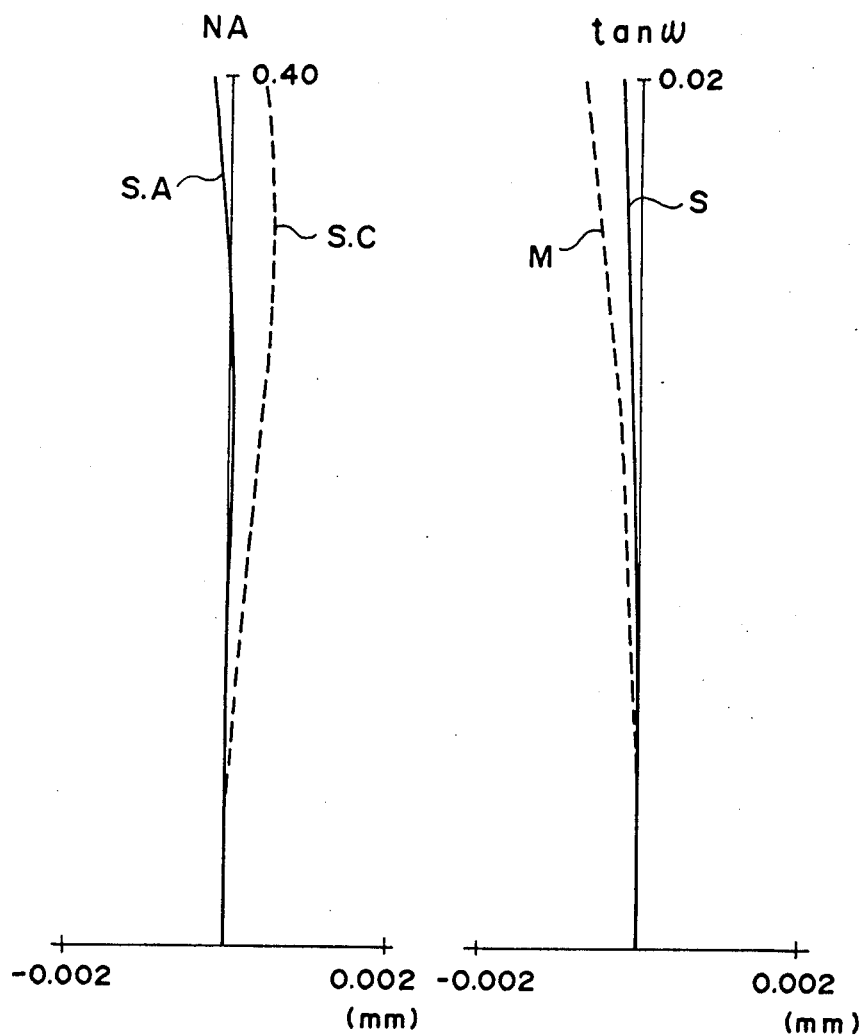
Figure 5:
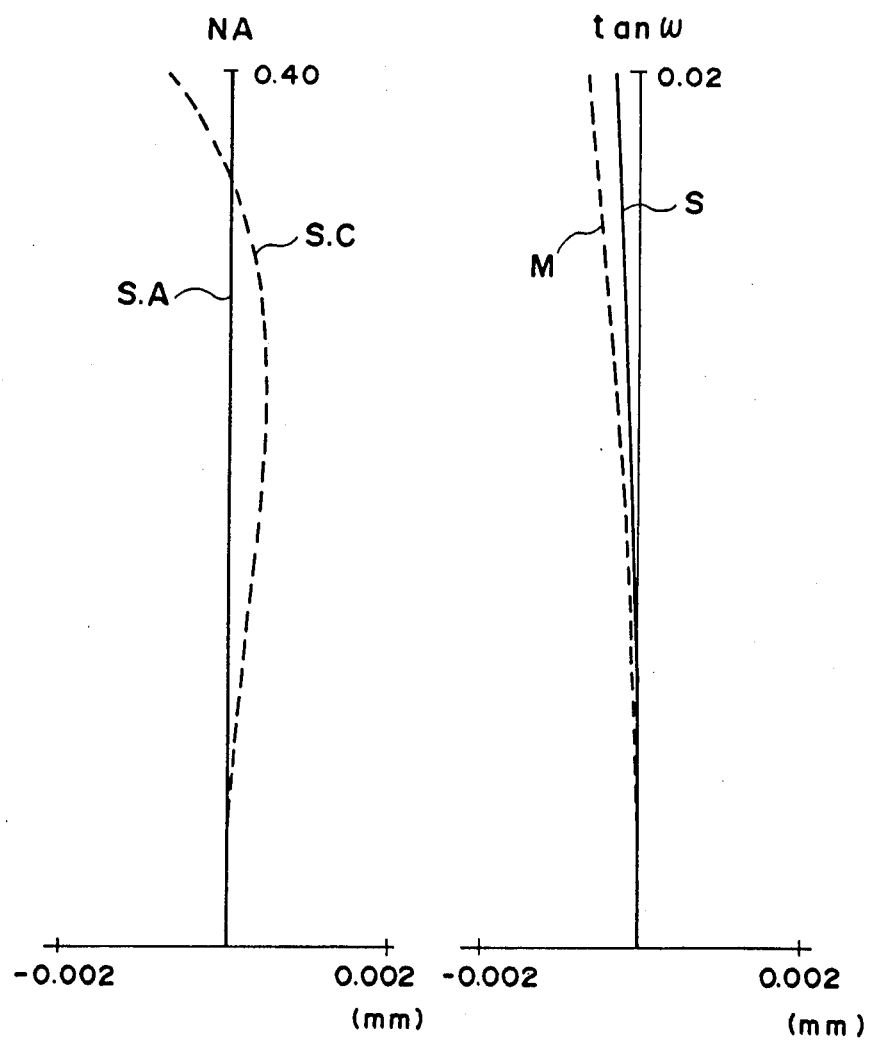
Figure 6:
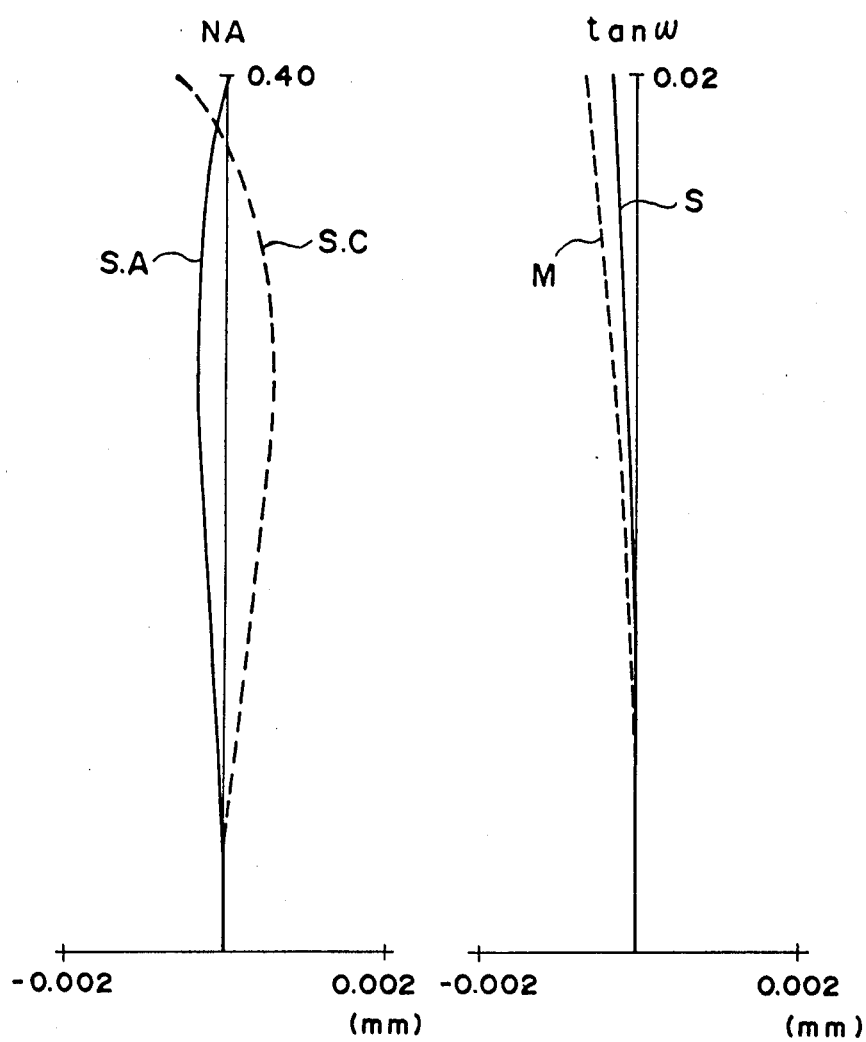

Referring to FIG. 1 which schematically shows the shape of a gradient index type single lens according to the present invention, reference numeral 1 designates the gradient index type single lens, letter O denotes the surface vertex of a first surface having a radius of curvature $r_1$, letter C designates the center point of the index distribution, reference characters $r_1$, $r_2$ and d are parameters representing the shape of the above-described lens, $\rho$ represents the distance from the center of index distribution C, and R represents the distance of the center of index distribution C from the surface vertex O.

When the distance from the surface vertex O of the first surface along the optic axis is x and the distance from the optic axis toward the radial direction is r, the index distribution of the spherical type applied to the present invention can conveniently be expressed by the following equations (4) and (5):

$$N(\rho) = \eta_0 + \eta_1 \rho + \eta_2 \rho^2 + \eta_3 \rho^3 + \eta_4 \rho^4 \quad (4)$$

$$\rho = \sqrt{(x - R^2)^2 + r^2} \quad (5)$$

where $\eta_0, \eta_1, \eta_2, \eta_3, \eta_4, \ldots$ are index distribution coefficients and $\eta_0$ represents the refractive index at the center of distribution. Among the index distribution coefficients $\eta_0, \eta_1, \ldots$, it is $\eta_0$ and $\eta_2$ that chiefly contribute to the paraxial amount and the third-order aberration coefficient and therefore, the principle of the aberration correction according to the present invention will hereinafter be described by the use of these two coefficients for convenience' sake. In a single lens having an index distribution of this type, the parameters which contribute to the paraxial amount and the third-order aberration coefficient are $r_1$, $r_2$, d, $\eta_0$, $\eta_2$, and R. On the orher hand, to correct spherical aberration and sine condition well, the values of the third-order spherical aberration coefficient I and coma coefficient II must both be made small. Accordingly, the conditions required of the paraxial amount and the third-order aberration coefficient are the following three:

$$\left. \begin{array}{l} I \approx 0 \\ II \approx 0 \\ f = \text{constant} \end{array} \right\} \quad (6)$$

From what has been described above, it is clear that even if $\eta_0$ and R of the six parameters are fixed, there are many solutions of $r_1$, $r_2$, $n_2$ and d which satisfy condition (6). That is, when the value of d is continuously changed, there are a plurality of sets of solutions of $r_1$, $r_2$ and $n_2$ to the respective values of d. Of these solutions, the practical solution must satisfy the aforementioned formulas (1), (2) and (3) when it is taken into consideration that the high-order aberration is small and that the working distance is of an appropriate value. For convenience of description, the aforementioned formulas (1), (2) and (3) will again be shown below.

$$1.0 \leq f/r_1 \leq 1.8 \quad (1)$$

$$0 < f/r_2 \leq 1.9 \quad (2)$$

$$0.2 \leq d/f \leq 1.5 \quad (3)$$

In the above formulas (1), (2) and (3), if the ratio $f/r_1$ of the focal length to the radius of curvature of the first surface exceeds the upper limit of condition (1), the spherical aberration created in the first surface will become great and the aberration correction in the entire system will become difficult. Also, if the lower limit of condition (1) is exceeded, the refractive power of the first surface will become small and the allotment of the refractive power by the index distribution in the lens will become great. That is, the gradient of the index distribution will become intense and thus, manufacture will become difficult.

If the ratio $f/r_2$ of the focal distance to the radius of curvature of the second surface exceeds the upper limit of condition (2), the gradient of the index distribution will again become intense and at the same time the negative refractive power of the second surface will become strong and therefore, the working distance cannot be secured sufficiently. The lower limit of condition (2) is a value naturally determined by the shape of the second surface. Further, the ratio d/f of the on-axis thickness of the lens to the focal length f exceeds the upper limit of condition (3), the maximum refractive index difference $\Delta \eta$ will necessarily become great and manufacture will become difficult. At the same time, the working distance cannot be secured sufficiently. If the lower limit of condition (2) is exceeded, there will arise a problem that the single thickness cannot be secured sufficiently, which in turn will lead to a problem in manufacture and working.

On the other hand, to accomplish good aberration correction, it is desirable that the following condition be further satisfied:

$$2.0 \leq \left( \frac{1}{r_1} + \frac{1}{r_2} \right) \frac{f^2}{d} \leq 6.5 \quad (7)$$

Condition (7) is a formula representing the relation between the curvatures $r_1$, $r_2$ of the surfaces and the surfaces and the thickness d of the lens. If any of the upper limit and the lower limit of this condition is exceeded, the magnitude of the aberrations created by the refraction in the first and second surfaces and the magnitude of the aberrations created by the light travelling zigzag in the lens will become unbalanced and the correction of spherical aberration and sine condition in the entire system will become difficult.

In the present invention, the center C of index distribution is not restricted to the interior of the lens or the vertex of each surface forming the lens as in the embodiments which will be described later, but may be at any position outside the lens if the position is on the optic axis. However, desirably, said C may be in the interior of the lens including the vertex of the lens or in the vicinity of the lens.

Also, the spherical type index distribution of the single lens according to the present invention can be formed by spherically working a parent material and thereafter using the ion exchange method. Further, it is also possible to adopt a manufacturing method similar to a method of manufacturing a so-called planar microlens comprising covering the surface of the parent material with a mask formed with a minute hole, and thereafter forming an index distribution as by the electric field introducing method, and also, in the 32nd Applied Physics United Lecture Meeting (spring of 1985), Koike, Sumi, Otsuka et al. reported the making of a spherical distribution lens by suspension polymerization.

Some examples of the numerical values of the present invention will be shown below. Table 1 below shows the lens data of first to fifth embodiments of the gradient index type single lens, and the characters in the table represent the previously described various parameters. Each lens data is the value when the focal length f is normalized to 1, and NA represents the numerical aperture.

TABLE 1

| | | | f = 1.0 | NA = 0.4 | | |
|---|---|---|---|---|---|---|
| | $r_1$ | $r_2$ | d | $n_0$ | $n_2$ | $n_4$ | R |
| 1 | 0.7306 | 2.8258 | 0.3 | 1.8 | −0.2340 | 0 | 0 |
| 2 | 0.7754 | 1.3093 | 0.7 | 1.8 | −0.2288 | 0 | 0 |
| 3 | 0.8452 | 0.6210 | 1.1 | 1.8 | −0.2051 | 0 | 0 |
| 4 | 0.7123 | 3.0334 | 0.4 | 1.7 | −0.2892 | $-0.7738 \times 10^{-3}$ | 0.2 |
| 5 | 0.6612 | 5.0240 | 0.4 | 1.6 | −0.3893 | $-0.4738 \times 10^{-1}$ | 0.4 |

FIGS. 2 to 6 show the various aberrations in the gradient index type single lenses according to the first to fifth embodiments shown in Table 1 above when the object distance is infinity. In these Figures, there are shown spherical aberration, the amount of unsatisfaction of sine condition and curvature of field, and SA represents spherical aberration, SC represents the amount of unsatisfaction of sine condition, S represents the curvature of field in the sagittal direction, and M represents the curvature of field in the meridional direction.

Among the embodiments shown in Table 1, the first, second and third embodiments are ones in which the center C of the distribution is at the vertex O of the first surface, the fourth embodiment is one in which said center C is in the medium, and the fifth embodiment is one in which said center C is at the vertex of the second surface, but of course, as previously described, an embodiment in which the center of the distribution is outside the lens is also possible. Also, in the fourth and fifth embodiments, the fourth-order index distribution coefficient $\eta_4$ is introduced and, by thus determining a high-order distribution, it is also possible to accomplish better aberration correction. As can be seen from the aberration graphs of FIGS. 2 to 6, the present gradient index type single lens has a performance sufficient in both sperical aberration and sine condition to be used as a pick-up objective or a collimating lens. Further, due to the property inherent to the gradient index type lens, Petzval sum can be decreased and curvature of field can b well corrected.

The lens data of sixth and seventh embodiments of the gradient index type single lens acording to the present invention will be shown in Table 2 below. This table is substantially similar in the form of description to Table 1, but it also contains the working distance WD in a case where the gradient index type single lens of the present invention is used as the objective of an optical disk. The focal length f is not normalized but is F=4.5, and each lens data shows the true value.

TABLE 2

| | $r_1$ | $r_2$ | d | WD | $n_0$ | $n_2$ | R |
|---|---|---|---|---|---|---|---|
| | | | f = 4.5 | NA = 0.5 | | | |
| 6 | 3.6801 | 13.5159 | 2.35 | 2.27 | 1.81841 | $-9.6819 \times 10^{-3}$ | 0 |
| 7 | 3.6328 | 12.0334 | 2.15 | 2.40 | 1.84963 | $-1.5897 \times 10^{-2}$ | 2.15 |

Figure 8:
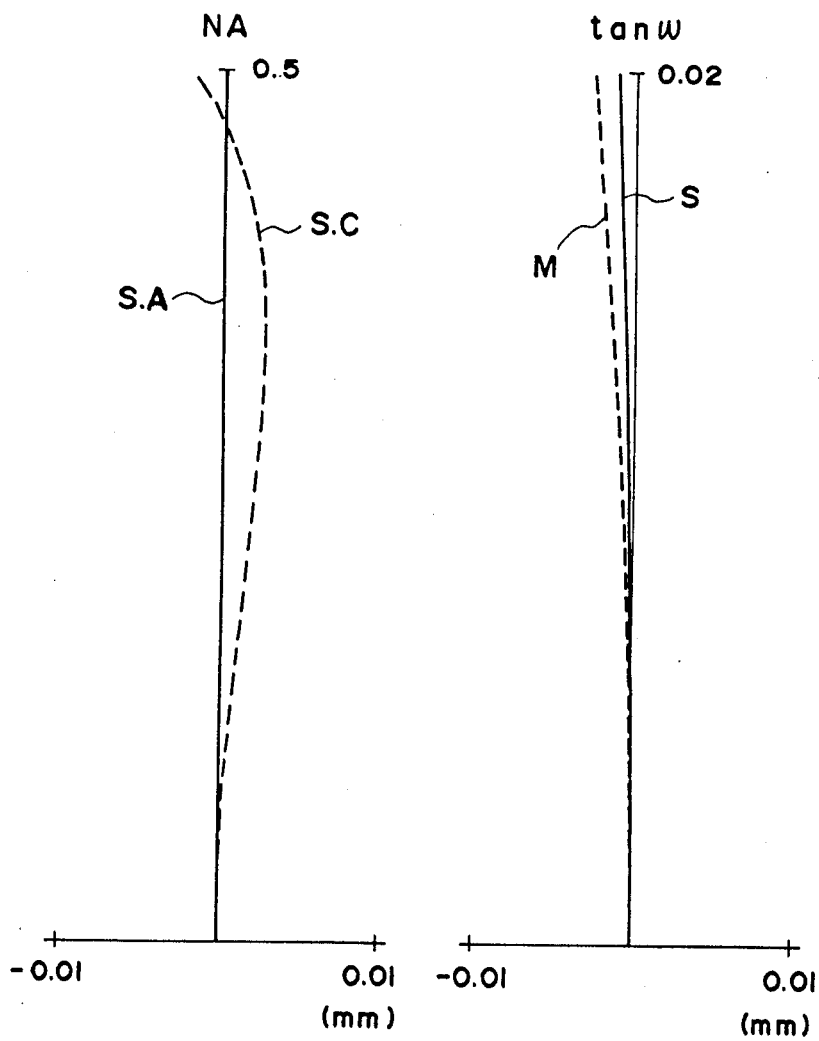
FIGS. 8 and 9 show the aberrations in gradient index type single lenses according to sixth and seventh embodiments of the present invention.
Figure 9:
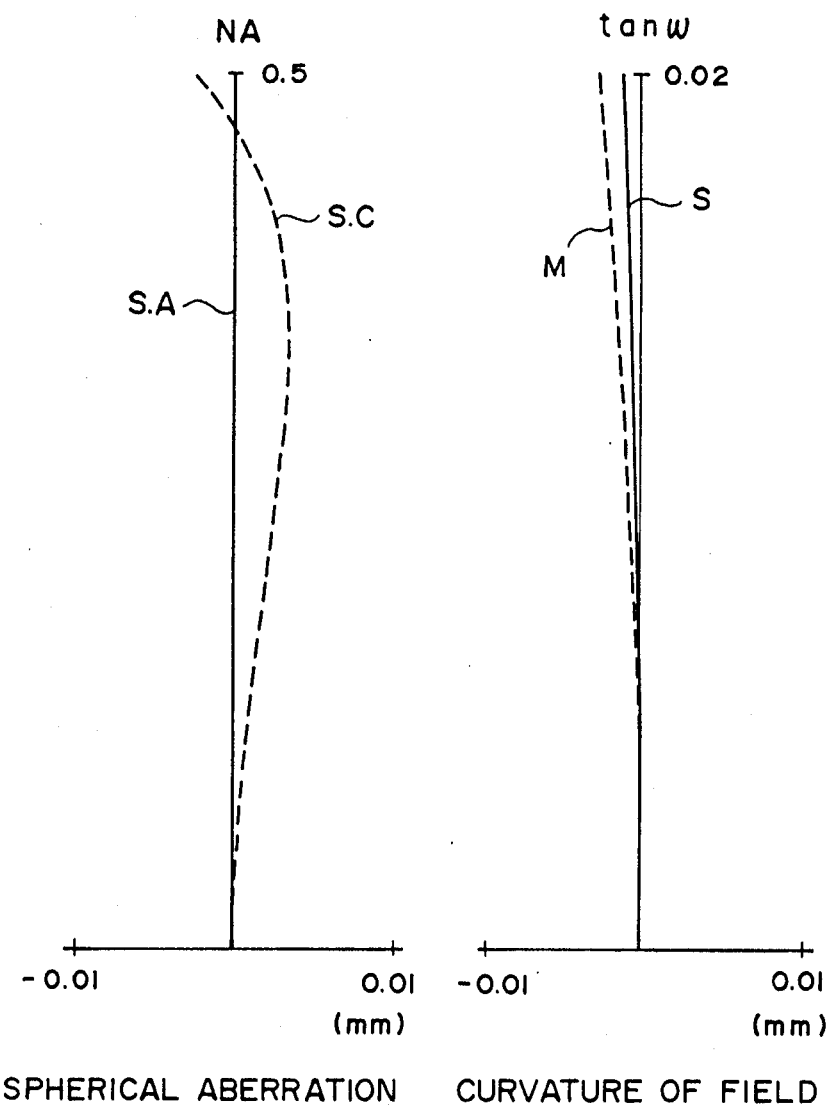

The gradient index type single lens according to the embodiments of Table 2 is an example in which the present invention is applied to the pick-up objective of an optical disk, and a cross-sectional view thereof is shown in FIG. 7. In FIG. 7, reference numeral 1 designates the gradient index type single lens according to the present invention, reference numeral 2 denotes the cover glass of an optical disk, and $r_1$, $r_2$ and d are parameters similar in significance to those in FIG. 1. In the present embodiment, the thickness t of the cover glass 2 is t=1.7 mm and the refractive index $N_G$ of the glass 2 is $N_G$=1.4855. WD represents the working distance, as previously described. FIGS. 8 and 9 show the various aberrations in the sixth and seventh embodiments when the object distance is infinity, and as can be seen from these Figures, the sixth and seventh embodiments have a good performance as a lens of this type and in particular, spherical aberration could be completely corrected.

FIGS. 8 and 9, like FIGS. 2 to 6, show spherical aberration, sine condition and curvature of field, and reference characters in these Figures are as previously described.

The embodiments shown above are merely an example of the present invention, and of course, a variety of gradient index type single lenses can be made on the basis of the idea of the present invention.

As described above, the gradient index type single lens according to the present invention is capable of correcting both spherical aberration and sine condition well by a very simple construction, and is a very useful lens as a pick-up objective, a collimator lens or the like.

What is claim is:

1. A gradient index single lens having:
   a first surface convex toward the object side, said first surface lying on the object side when said lens is used at a reduction magnification;
   a second surface concave toward the image side, said second surface lying on the image side when said lens is used at a reduction magnification; and
   an index distribution formed in the interior of said lens, said index distribution having a sphere-symmetrical distribution about a certain point on the optical axis.

2. A gradient index single lens according to claim 1, satisfying the following conditions:

$$1.0 \leq f/r_1 \leq 1.8$$

$$0 < f/r_1 \leq 1.9$$

$$0.2 \leq d/f \leq 1.5$$

where $r_1$ and $r_2$ are the radii of curvature of said first surface and said second surface, respectively, d is the on-axis thickness of said lens, and f is the focal length of said lens.

3. A gradient index single lens according to claim 2, further satisfying the following condition:

$$2.0 \leq \left( \frac{1}{r_1} + \frac{1}{r_2} \right) \frac{f^2}{d} \leq 6.5$$

4. A gradient index single lens having:
   a first surface convex toward the object side, said first surface lying on the object side when said lens is used at a reduction magnification;
   a second surface concave toward the image side, said second surface lying on the image side when said lens is used at a reduction magnification; and
   an index distribution fdrmed in the interior of said lens, said index distribution having a sphere-symmetrical distribution about the vicinity of the vertex of said first surface or said second surface;
   said lens satisfying the following conditions:

$$1.0 \leq f/r_1 \leq 1.8$$

$$0 < f/r_2 < 1.9$$

$$0.2 \leq d/f \leq 1.5$$

where $r_1$ and $r_2$ are the radii of curvature of said first surface and said second surface, respectively, d is the on-axis thickness of said lens, and f is the focal length of said lens.

* * * * *

UNITED STATES PATENT AND TRADEMARK OFFICE
CERTIFICATE OF CORRECTION

PATENT NO. : 4,721,369

DATED : January 26, 1988

INVENTOR(S) : JUN HATTORI, ET AL.

It is certified that error appears in the above-identified patent and that said Letters Patent is hereby corrected as shown below:

Column 6, line 49, "fdrmed" should read --formed--.

Signed and Sealed this

Twenty-fourth Day of May, 1988

Attest:

DONALD J. QUIGG

*Attesting Officer*  *Commissioner of Patents and Trademarks*